US 7,010,158 B2

(12) United States Patent
Cahill et al.

(10) Patent No.: US 7,010,158 B2
(45) Date of Patent: Mar. 7, 2006

(54) METHOD AND APPARATUS FOR THREE-DIMENSIONAL SCENE MODELING AND RECONSTRUCTION

(75) Inventors: Nathan D. Cahill, Rochester, NY (US); Mark R. Bolin, Fairport, NY (US); Lawrence A. Ray, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 757 days.

(21) Appl. No.: 10/010,795

(22) Filed: Nov. 13, 2001

(65) Prior Publication Data

US 2003/0091226 A1 May 15, 2003

(51) Int. Cl.
*G06K 9/00* (2006.01)

(52) U.S. Cl. .................. 382/154; 382/294; 348/36; 345/419

(58) Field of Classification Search .............. 382/162, 382/276, 284, 285, 294–296, 312, 154; 348/36; 345/419–420, 582, 589, 599, 629, 648
See application file for complete search history.

(56) References Cited

U.S. PATENT DOCUMENTS

| | | | | |
|---|---|---|---|---|
| 4,912,336 A * | 3/1990 | Nayar et al. | ........... | 250/559.17 |
| 4,935,616 A | 6/1990 | Scott | ........... | 250/213 |
| 6,044,181 A * | 3/2000 | Szeliski et al. | ........... | 382/284 |
| 6,075,905 A * | 6/2000 | Herman et al. | ........... | 382/284 |
| 6,628,298 B1 * | 9/2003 | Debevec | ........... | 345/632 |
| 6,639,594 B1 * | 10/2003 | Zhang et al. | ........... | 345/426 |
| 6,639,596 B1 * | 10/2003 | Shum et al. | ........... | 345/427 |
| 6,677,956 B1 * | 1/2004 | Raskar et al. | ........... | 345/581 |
| 6,677,982 B1 * | 1/2004 | Chen et al. | ........... | 348/36 |
| 6,750,873 B1 * | 6/2004 | Bernardini et al. | ........... | 345/582 |

OTHER PUBLICATIONS

"Automatic 3D Modeling using Range Images Obtained from Unknow Viewpoints" by daniel F. Huber. Pro of the third international conference on 3-D Digital Imaging and Modeling (3DIM), May 28, Jun. 1, 2001, pp. 153-160.*
U.S. Appl. No. 09/686,610, filed Oct. 11, 2000, Chen et al.
U.S. Appl. No. 09/803,802, filed Mar. 12, 2001, Chen et al.
U.S. Appl. No. 09/572,522, filed May 17, 2000, Ray et al.
"Modeling and Rendering Architecture from Photographs: A hybrid geometry- and image-based approach" by Paul E. Debevec, Camillo J. Taylor, Jitendra Malik. Computer Graphics, Annual Conference Series, ACM SIGGRAPH, pp. 11-20, 1996.

(Continued)

*Primary Examiner*—Sheela Chawan
(74) *Attorney, Agent, or Firm*—David M. Woods

(57) ABSTRACT

A three-dimensional model of a scene is obtained from a plurality of three-dimensional panoramic images of a scene, wherein each three-dimensional panoramic image is derived from a plurality of range images captured from a distinct spatial position. Transformations are determined that align the plurality of three-dimensional panoramic images, and spatial information is integrated from the plurality of three-dimensional panoramic images to form a spatial three-dimensional model of the scene. Finally, intensity and texture information is integrated from the plurality of three-dimensional panoramic images onto the spatial three-dimensional model to form a three-dimensional model of the scene containing both spatial and intensity information.

17 Claims, 4 Drawing Sheets

OTHER PUBLICATIONS

"Zippered Polygon Meshes from Range Images" by Greg Turk and Marc Levoy. Computer Graphics, Annual Conference Series, ACM SIGGRAPH, pp. 311-318, 1994.

"A Method for Registration of 3-D Shapes" by Paul J. Besl and Neil D. McKay. IEEE Trans. Pattern Analysis and Machine Intelligence, 14(2), pp. 239-256, Feb. 1992).

"Spin-Images: A Representation for 3-D Surface Matching" by Andrew Edie Johnson. Ph.D. thesis, Carnegie Melon University, 1997.

"Automatic 3D Modeling Using Range Images Obtained from Unknown Viewpoints" by Daniel F. Huber. Proc. of the Third International Conference on 3-D Digital Imaging and Modeling (3DIM), May 28- Jun. 1, 2001, pp. 153-160.

"3-D Scene Data Recovery Using Omnidirectional Multibaseline Stereo" by Sing Bing Kang and Richard Szeliski. Int. Journal of Comp. Vision, 25(2). pp. 167-183, 1997.

"Innovative range imager sees how targets measure up: For smart weapons and civilian uses too" by Ken Frazier. Sandia Labs News, vol. 46, No. 19, Sep. 16, 1994.

* cited by examiner

METHOD AND APPARATUS FOR THREE-DIMENSIONAL SCENE MODELING AND RECONSTRUCTION

FIELD OF THE INVENTION

The invention relates generally to the field of computer graphics, and in particular to the field of image-based three-dimensional scene modeling and reconstruction.

BACKGROUND OF THE INVENTION

Three-dimensional models of physical scenes are required for a wide range of applications. These applications include virtual reality walk-throughs, architectural modeling, and computer graphics special effects. These scenes have been typically generated manually through tedious and time-consuming processes. Because of the difficult and expensive process of manually generating such models, a vast research effort has been underway to investigate image-based schemes for constructing the 3-D models. Image-based schemes have traditionally involved inferring the 3-D geometry of the physical scene from a plurality of 2-D photographs. One such approach is that of Kang, S. B. and Szeliski, R. ("3-D Scene Data Recovery Using Omnidirectional Multibaseline Stereo," *Int. Journal of Comp. Vision*, 25(2), pp. 167–183, 1997). In this approach, a series of 2-D panoramic images is generated, and these 2-D panoramic images are used in a stereo vision sense to extract 3-D scene data. The extracted 3-D scene data is then integrated, and the panoramic images are texture-mapped onto the 3-D model.

The drawback of traditional image-based schemes for 3-D modeling is that they typically yield sparse 3-D scene data. This forces the user to make somewhat arbitrary assumptions about the 3-D structure of the scene prior to the texture-mapping step. For this reason, recent research has turned to range imaging systems to provide dense 3-D scene data for reconstruction. Such systems are capable of automatically sensing the distance to objects in a scene as well as the intensity of incident light. Both range and intensity information is typically captured discretely across a two-dimensional array of image pixels.

An example of such a system is found in U.S. Pat. No. 4,935,616 (and further described in the *Sandia Lab News*, vol. 46, No. 19, Sep. 16, 1994), which describes a scannerless range imaging system using either an amplitude-modulated high-power laser diode or an array of amplitude-modulated light emitting diodes (LEDs) to completely illuminate a target scene. A version of such a scannerless range imaging system that is capable of yielding color intensity images in addition to the 3-D range images is described in commonly assigned, copending U.S. patent application Ser. No. 09/572,522, entitled "Method and Apparatus for a Color Scannerless Range Imaging System" and filed May 17, 2000 in the names of L. A. Ray and L. R. Gabello. The scannerless range imaging system will hereafter be referred to as an "SRI camera".

D. F. Huber describes a method (in "Automatic 3-D Modeling Using Range Images Obtained from Unknown Viewpoints," *Proc. of the Third International Conference on 3-D Digital Imaging and Modeling* (3DIM), May 28–Jun. 1, 2001) requiring no manual intervention for 3-D reconstruction using a plurality of range images. Huber's algorithm for 3-D modeling generates a 3-D model from a series of range images, assuming nothing is known about the relative views of the object. It can be broken down into three phases: (1) determining which views contain overlaps, (2) determining the transformation between overlapping views, and (3) determining the global position of all views. Huber's method does not assume that the overlapping views are known; therefore, it does not require any prior information to be supplied by the user.

The first two steps of Huber's algorithm use a previous algorithm described in a Ph.D. Thesis by A. E. Johnson, entitled "Spin-Images: A Representation for 3-D Surface Matching," Carnegie Melon University, 1997. Johnson presents a system that is capable of automatically registering and integrating overlapping range images to form a complete 3-D model of an object or scene. This system is fully automatic and does not require any a priori knowledge of the relative positions of the individual range images. Johnson's algorithm begins by converting each range image to a surface mesh. This is accomplished by triangulating adjoining range values that are within a difference threshold. Range differences that exceed this threshold are assumed to indicate surface discontinuities.

The next step in Johnson's algorithm (and step (2) of Huber's algorithm) is to determine the transformations that align the surface meshes within a common coordinate system. This is accomplished by identifying correspondences between the overlapping regions of the meshes. Johnson uses a technique based on matching "spin-image" surface representations to automatically identify the approximate location of these correspondence points. The coarse alignment of the surface meshes is then refined using a variation of an Iterative Closest Point algorithm (see Besl, P. and McKay, N., "A Method for Registration of 3-D Shapes," *IEEE Trans. Pattern Analysis and Machine Intelligence*, 14(2), pp. 239–256, February 1992).

Once the overlapping views and local transformations are estimated, step (3) of Huber's algorithm entails using a series of consistency measures in combination with a model graph to find any inconsistencies in the local transformations. Huber recognizes, however, that there are computational costs in scaling his technique to a large number of views. For that reason, the computational cost of step (3) can grow prohibitively expensive as the number of input range images gets large.

In certain situations where assumptions can be made about the relative views of a collection of range images, we need not resort to Huber's algorithm for 3-D modeling and reconstruction. For example, if a series of overlapping range images are captured from different views that have a common central nodal point, they can be merged to form a 3-dimensional panorama (a 360° model of both the 3-D spatial and intensity information visible from that central nodal point). This model is typically derived by utilizing a range camera to capture a sequence of overlapping range images as the camera is rotated around the focal point of the camera lens. The 3-D spatial and intensity information from the sequence of images are merged together to form the final 360 degree 3-D panorama.

An example of such a 3-D panoramic system that yields sparse range images is described in commonly assigned, copending U.S. patent application Ser. No. 09/686,610, entitled "Method for Three Dimensional Spatial Panorama Formation" and filed Oct. 11, 2000 in the names of S. Chen and L. A. Ray. An example of a system that yields dense range images using a SRI camera is described in commonly assigned, copending U.S. patent application Ser. No. 09/803, 802, entitled "Three Dimensional Spatial Panorama Formation with Scannerless Range Imaging System" and filed Mar. 12, 2001 in the names of by S. Chen and N. D. Cahill.

Three-dimensional panoramas provide a natural means for capturing and representing a model of an environment as seen from a given viewpoint. However, in order to model a complete environment, it is necessary to merge information collected from a variety of spatial locations. If, as described in the prior art, a collection of individual range images collected from arbitrary spatial positions and viewpoint orientations are used to model the complete environment, the cost of determining global positions for each range image can be extremely expensive, as previously discussed. What is needed is a technique to reduce this computational cost.

SUMMARY OF THE INVENTION

The present invention is directed to overcoming one or more of the problems set forth above. Briefly summarized, according to one aspect of the present invention, a method for deriving a three-dimensional model of a scene from a plurality of images of the scene includes the steps of: (a) generating a plurality of three-dimensional panoramic images of a scene, wherein each three-dimensional panoramic image is derived from a plurality of range images captured from a distinct spatial position; (b) determining transformations that align the plurality of three-dimensional panoramic images; (c) integrating spatial information from the plurality of three-dimensional panoramic images to form a spatial three-dimensional model of the scene; and (d) integrating intensity and texture information from the plurality of three-dimensional panoramic images onto the spatial three-dimensional model to form a three-dimensional model of the scene containing both spatial and intensity information.

More specifically, the three-dimensional panoramic images are generated by positioning a camera at a first distinct spatial location; acquiring the plurality of range images of the scene by rotating the camera about a vertical axis relative to the scene, wherein there is an inter-overlap region between adjacent images; and forming a three-dimensional panoramic image about the vertical axis from the plurality of acquired range images. Then a plurality of three-dimensional panoramic images are created by repeating these steps at additional spatial positions in the scene. In one embodiment, the camera is an SRI camera and the panoramic images are color images.

The advantage of this invention is that the use of the 3-D panoramic images drastically simplifies the merging process compared to merging the entire set of individual range images. This invention enables a complete 3-D surface description to be easily derived for an arbitrary physical scene.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
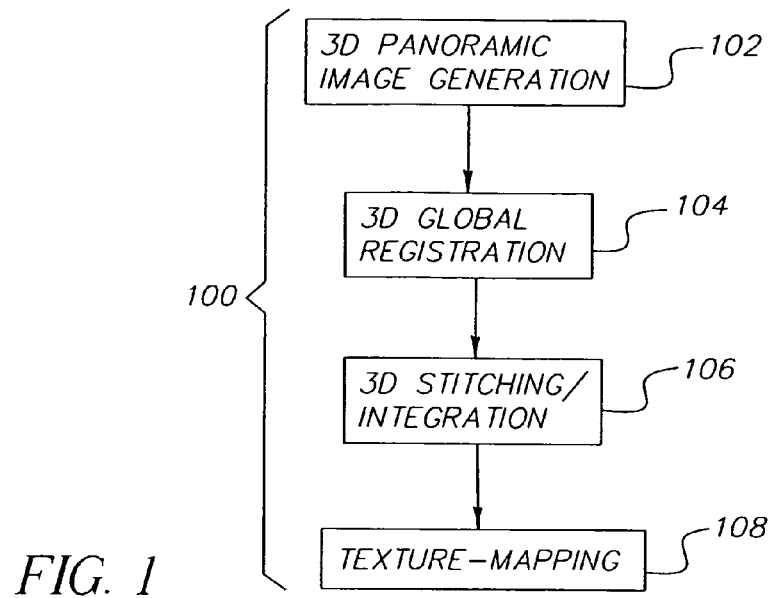
FIG. 1 is a flowchart of a method for 3-D scene modeling and reconstruction according to the invention.

Because image processing systems employing three-dimensional scene modeling are well known, the present description will be directed in particular to attributes forming part of, or cooperating more directly with, method and apparatus in accordance with the present invention. Attributes of the method and apparatus not specifically shown or described herein may be selected from those known in the art. In the following description, a preferred embodiment of the present invention would ordinarily be implemented as a software program, although those skilled in the art will readily recognize that the equivalent of such software may also be constructed in hardware. Given the system as described according to the invention in the following materials, software not specifically shown, suggested or described herein that is useful for implementation of the invention is conventional and within the ordinary skill in such arts.

As described in the background section, three-dimensional panoramas provide a natural means for capturing and representing a model of an environment as seen from a given viewpoint. However, in order to model a complete environment, it is necessary to merge information collected from a variety of spatial locations. If a collection of individual range images collected from arbitrary spatial positions and viewpoint orientations are used to model the complete environment, the cost of determining global positions for each range image can be extremely expensive.

If, instead of collecting a multitude of range images from arbitrary spatial positions, the individual range images are chosen so that they are captured about one of a small number of spatial positions, a three-dimensional panorama can be generated about each spatial position (e.g., by the method described in the aforementioned Ser. No. 09/803,802). The 3-D spatial panoramas can then be treated as individual range images. Huber's algorithm can then be applied to construct a 3-D model of the scene using the 3-D panoramic images (the number of which is much less than the number of original range images). For example, suppose a user wants to construct a 3-D model of a scene and captures 72 range images. If those range images are chosen so that there are four distinct nodal points among all the views, with 18 overlapping range images captured about each nodal point, then four 3-D spatial panoramas can be formed. Those four 3-D spatial panoramas can be combined to form a 3-D model using Huber's algorithm. In this instance, there are only four range images as opposed to the original 72, so the complexity of the optimization performed in step (3) of Huber's algorithm is drastically reduced. Furthermore, if there are small areas of the scene that are not adequately represented by the collection of 3-D spatial panoramic images, one or more individual range images can be added to the collection of panoramic images prior to employing Huber's algorithm. This would be useful in situations where there still remain small holes in the coverage of the scene, and an entire new 3-D spatial panoramic image is not necessary.

FIG. 1 is a flowchart of the method 100 for 3-D scene modeling and reconstruction as described by this invention. The method 100 comprises the steps of generating (102) a plurality of 3-dimensional panoramic images, determining (104) the global registration positions of all of the 3-D panoramic images, stitching or integrating (106) the registered 3-D panoramic images into a 3-D model, and texture-mapping (108) the 3-D model with intensities derived from the intensities of the original 3-D panoramic images.

Figure 2:
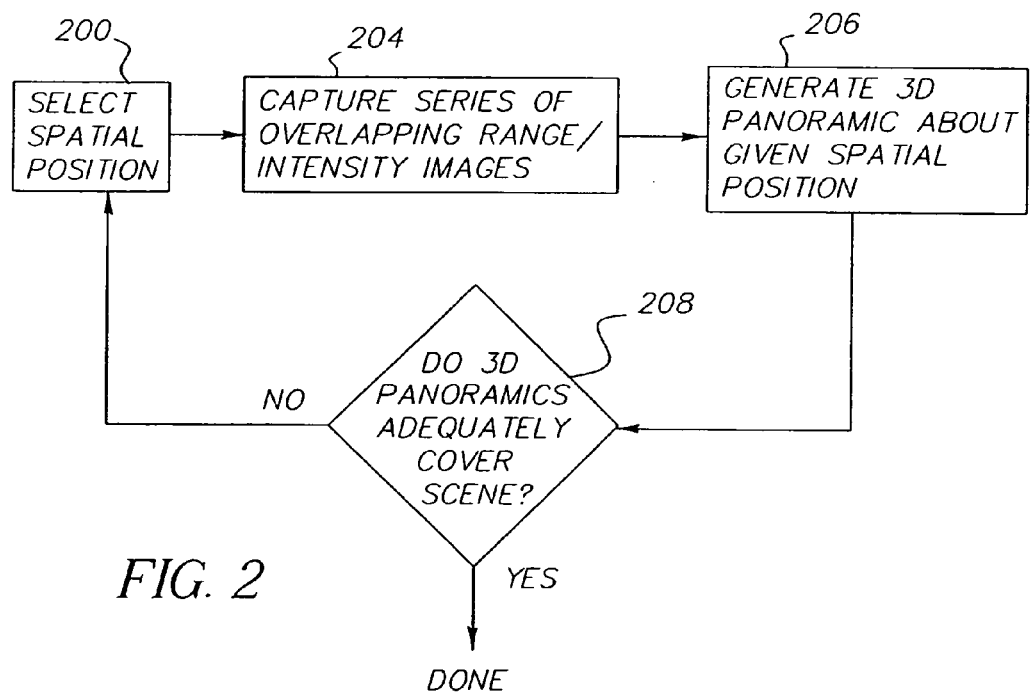
FIG. 2 is a flowchart of the 3-dimensional panoramic image generation step shown in FIG. 1.

FIG. 2 is a flowchart of the step 102 of generating the plurality of 3-dimensional panoramic images. A spatial position in the real-world scene is selected (200), and then a plurality of partially overlapping range/intensity images are captured (204) with a range camera, e.g. with a SRI camera. In step 206, a 3-D panoramic image corresponding to the selected spatial position is generated. A query 208 as to whether the generated 3-D panoramic images provide adequate coverage of the scene is given. A negative response to the query 208 restarts the process from a different spatial position in step 200. An affirmative response indicates that the plurality of 3-D panoramic images has been generated, and the step 102 is complete.

Figure 3:
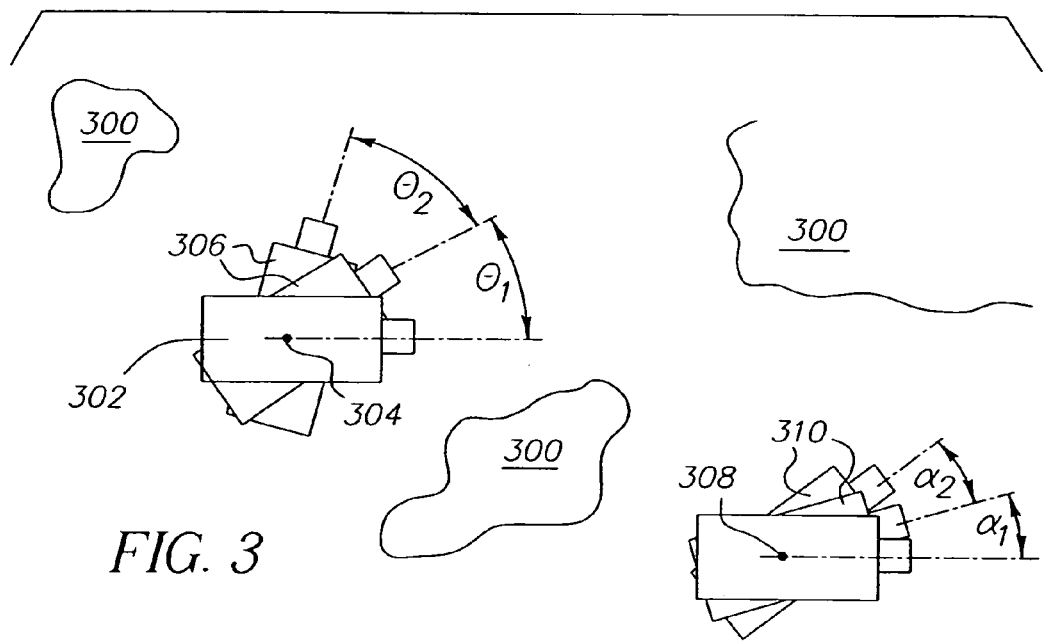
FIG. 3 is a graphical depiction of an image capture technique operating from a plurality of spatial positions in a real scene.

FIG. 3 depicts a pictorial representation of the method and apparatus for 3-D modeling as used by this invention. The real-world scene typically contains many objects 300 in different areas. A range imaging system 302 is used to generate both intensity and 3-D information about the scene from a given viewpoint. An initial spatial position 304 is selected, and range/intensity images are captured from a plurality of views 306. Typically, these views would comprise various angles ($\theta_1$, $\theta_2$, etc.) about the vertical axis through the selected spatial point 304. Once a 3-D panoramic image corresponding to the spatial position 304 is generated, another spatial position is chosen 308. The process of capturing range images from different views 310 is again carried out according to the method described in FIG. 2, and the process is continued for additional spatial positions until all desired 3-D panoramic images are generated.

In a preferred embodiment, the 3-D panoramic images are generated with the system described in the aforementioned Ser. No. 09/803,802, according to which a three-dimensional panorama is derived from a plurality of images of a scene generated from a SRI camera that generates 3D range values for the images with respect to a local three-dimensional coordinate system wherein the image is captured. The invention involves acquiring a plurality of images of the scene by rotating the camera about a Y-axis (vertical axis); determining the difference in constant offsets for the relative 3D range values of subsequent images; generating (X,Y,Z) values in local three-dimensional coordinate systems for each 3D range image; selecting a reference three-dimensional world coordinate system against which the overall spatial information of the scene can be correctly presented; transforming the generated (X,Y,Z) values from each of the local three-dimensional coordinate systems to the selected reference three-dimensional world coordinate system; warping the transformed (X,Y,Z) images to correct for geometric distortion caused by the perspective projection, and forming a plurality of warped (X,Y,Z) images; registering adjacent warped (X,Y,Z) images; and forming a three-dimensional panorama, i.e., a (X,Y,Z) panorama, using the warped (X,Y,Z) images. Further details of this system can be found in the aforementioned Ser. No. 09/803,802, which is incorporated herein by reference.

Figure 4:
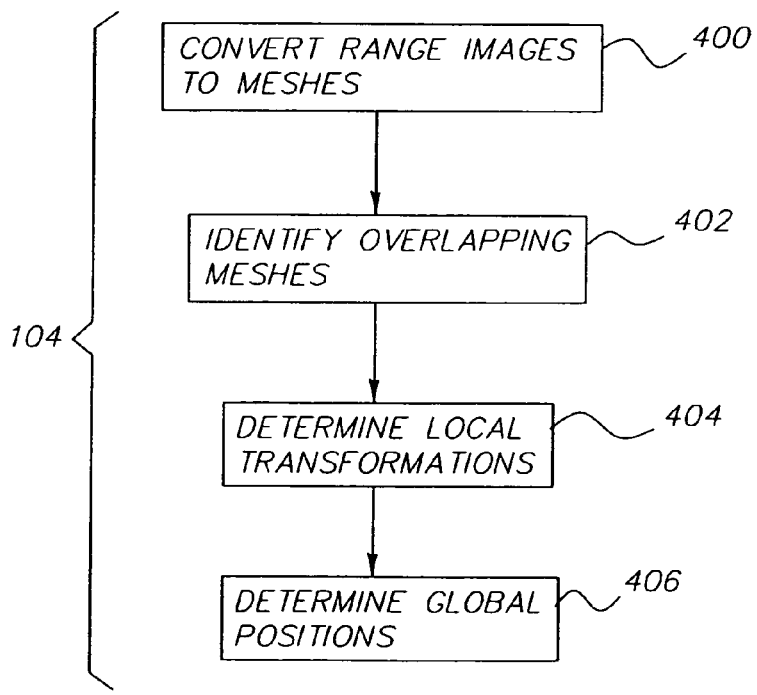
FIG. 4 is a flowchart of the 3-dimensional global registration step shown in FIG. 1.

FIG. 4 is a flowchart of the 3-D global registration step 104. This step utilizes Huber's algorithm, as described in the aforementioned article "Automatic 3-D Modeling Using Range Images Obtained from Unknown Viewpoints," from the *Proc. of the Third International Conference on 3-D Digital Imaging and Modeling* (3*DIM*), May 28–Jun. 1, 2001, as complemented by the Ph.D. Thesis by A. E. Johnson, entitled "Spin-Images: A Representation for 3-D Surface Matching," Carnegie Melon University, 1997, both of which are incorporated herein by reference. Each 3-D panoramic range image is converted into a mesh representation 400. In step 402, overlapping meshes are identified, and the local transformations representing their respective registrations are computed in step 404. The set of global positions is then found in step 406 by checking the global consistency of the collection of local transformations. (As mentioned earlier, it may be desirable to juxtapose one or more range images between a pair of three-dimensional panoramic images before determining the transformations that align the plurality of three-dimensional panoramic images.)

Huber's algorithm yields a set of globally consistent transformations to align all of the 3-D surfaces describing the 3-D panoramic range images to generate the 3-D model. After the transformations are applied and the surfaces are aligned, the overlapping regions are integrated into single polygonal mesh. Johnson proposes a volumetric technique for integrating surfaces. An alternate approach based on a zippering technique was presented by Turk and Levoy in "Zippered Polygon Meshes from Range Images," *Computer Graphics, Annual Conference Series*, ACM SIGGRAPH, pp. 311–318, 1994, which is incorporated herein by reference.

Referring to FIGS. 1 and 4, the globally registered 3-D panoramic images output from the step 406 are stitched or integrated into a 3-D model in the 3-D stitching or integration step 106. The final step in the process is to integrate the intensity images taken from the various range camera positions into a single globally consistent texture map. Accordingly, referring to FIG. 1, the 3-D model is texture mapped in the texture mapping step 108 with intensities derived from the intensities of the original 3-D panoramic images. This is typically accomplished by generating a texture map such that the intensity at each surface point is the average of the intensity values from the one or more intensity images that project onto that surface point (this assumes a Lambertian reflectance model).

An alternative texturing technique is to use the View-Dependent Texture-Mapping approach presented by Debevec et. al. ("Modeling and Rendering Architecture from Photographs: A hybrid geometry- and image-based approach," *Computer Graphics, Annual Conference Series*, ACM SIGGRAPH, pp. 11–20, 1996), which is incorporated herein by reference. Debevec's algorithm interpolates between the surface intensity captured from various camera angles to determine the surface reflectance that would be visible from intermediate camera positions. This approach eliminates the Lambertian assumption, instead assuming a reflectance model that depends on the viewpoint of the observer, and consequently yields a more accurate rendering that incorporates the differences in surface reflectance as a function of the viewing angle.

Figure 5:
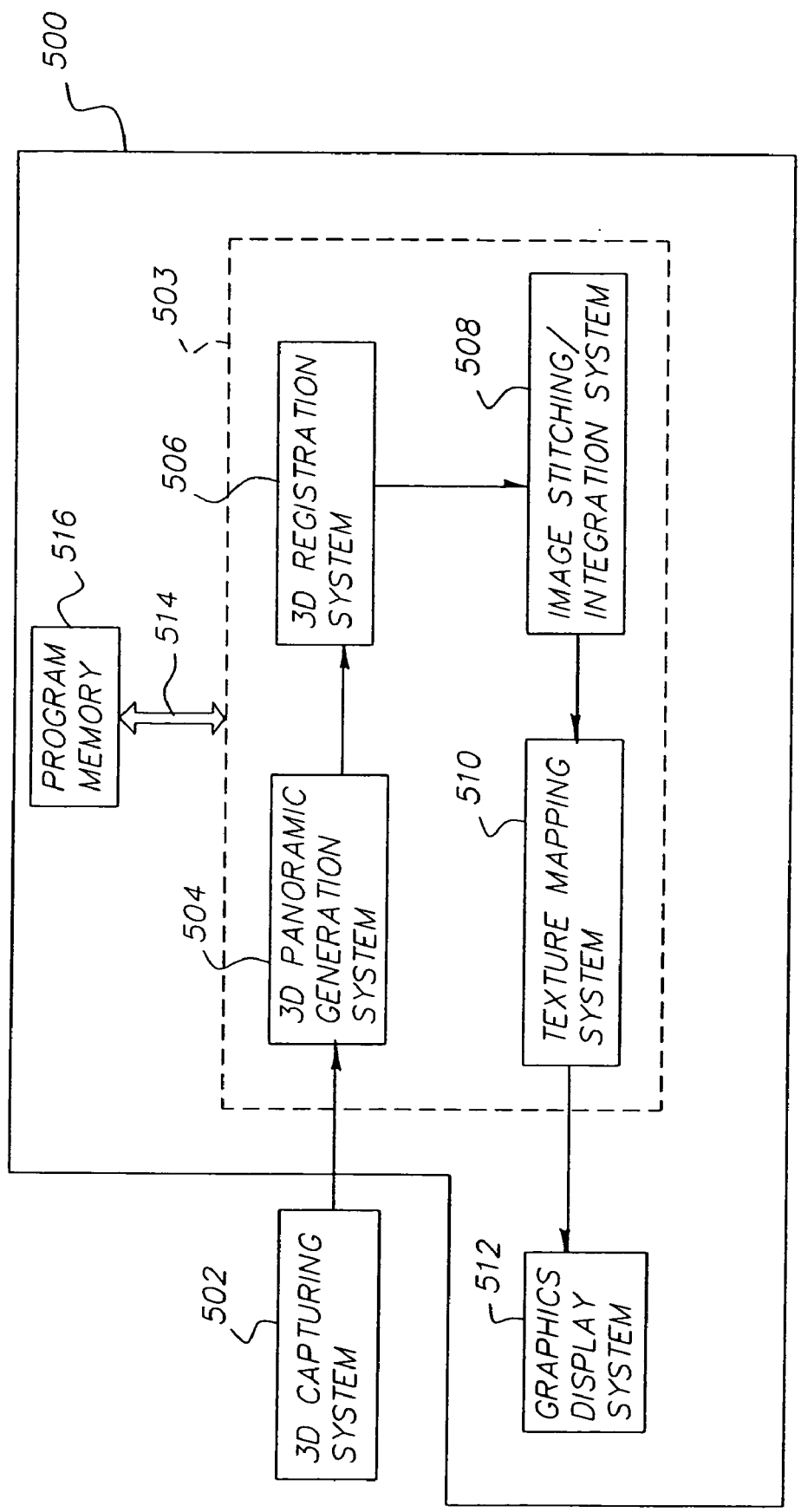
FIG. 5 is a typical system configuration for implementing the 3-D scene modeling and reconstruction method shown in FIG. 1.

While the overall methodology of the invention is described above, the invention can be embodied in any number of different types of systems and executed in any number of different ways, as would be known by one ordinarily skilled in the art. For example, as illustrated in FIG. 5, a typical hardware configuration in accordance with the invention preferably has a 3-D capturing system 502 connected to, or otherwise providing input to, at least one information handling/computer system 500, which includes a processor or central processing unit (CPU) 503 for implementing the several systems comprising the invention. These systems comprise a system 504 to generate 3-D panoramic images from the captured 3-D images, a system 506 to identify the global registration of all of the 3-D panoramic images, a system 508 to stitch or integrate the collection of 3-D panoramic images into a 3-D model of the scene, a system 510 to texture-map the intensities onto the 3-D model, and a graphics display system 512 to allow a user to interact with or generate arbitrary views of the 3-D model. The processing unit 503 is interconnected via a system bus 514 to a suitable program memory 516.

If the invention is implemented as a computer program (rather than hardware), the program may be stored in the program memory 516. Such memory is a conventional computer readable storage medium, which may comprise, for example; magnetic storage media such as a magnetic disk (such as a floppy disk or a hard drive) or magnetic tape; optical storage media such as an optical disc, optical tape, or machine readable bar code; solid state electronic storage devices such as random access memory (RAM), or read only memory (ROM); or any other physical device or medium employed to store a computer program.

Figure 6:
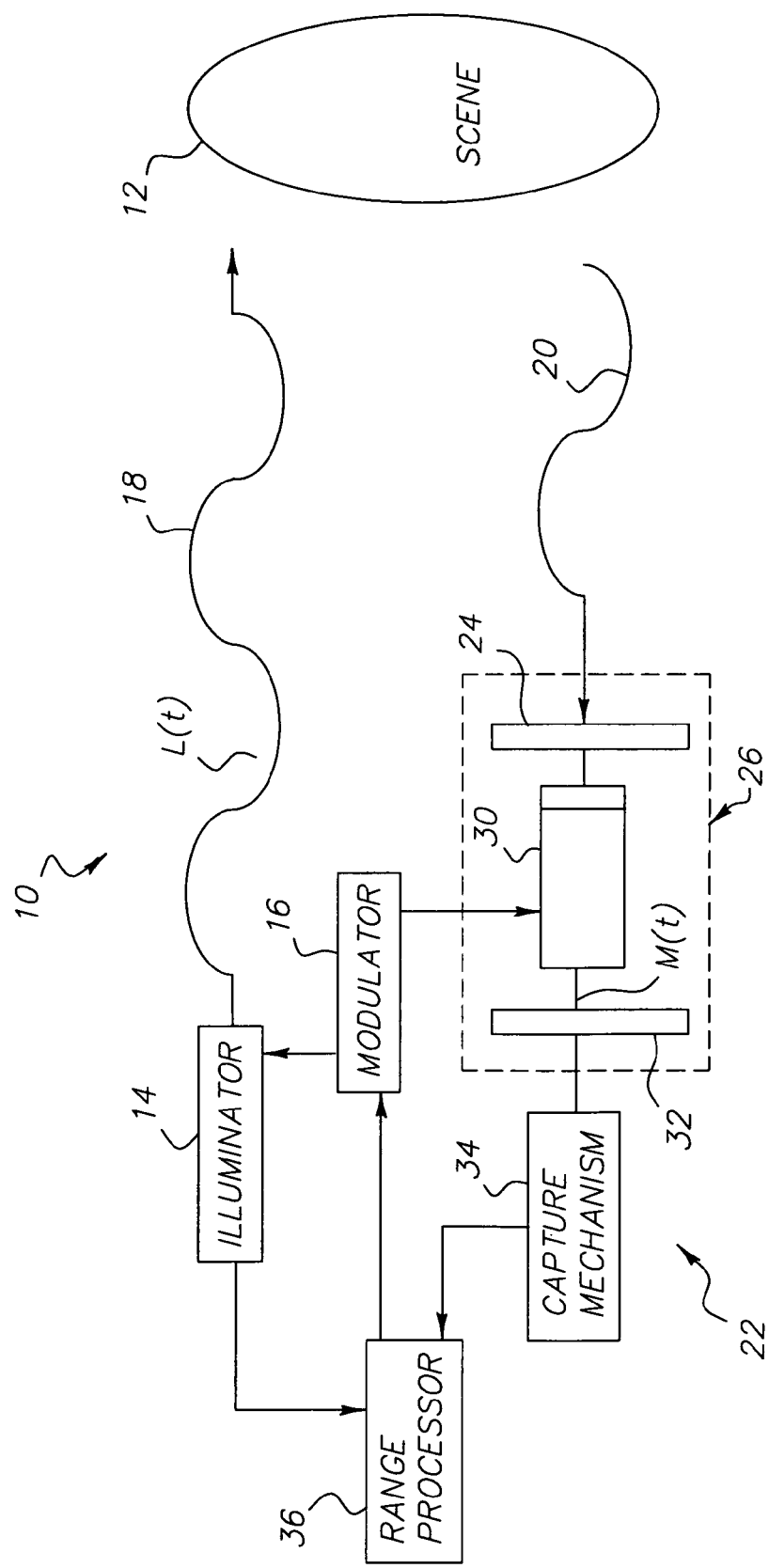
FIG. 6 is a block diagram of a known SRI camera which can be used in the system configuration shown in FIG. 5 to perform the image capture technique shown in FIG. 3.

In the preferred embodiment, the 3-D capturing system 502 is a scannerless range imaging system, or more specifically, the SRI camera heretofore mentioned. Referring to FIG. 6, an SRI camera 10 is shown as a laser radar that is used to illuminate a scene 12 and then to capture an image comprising the scene 12. An illuminator 14 emits a beam of electromagnetic radiation whose frequency is controlled by a modulator 16. Typically, the illuminator 14 is a laser device which includes an optical diffuser in order to effect a wide-field illumination. The modulator 16 provides an amplitude varying sinusoidal modulation that is sufficiently high in frequency (e.g., 12.5 MHz) to attain sufficiently accurate range estimates. The output beam 18 is directed toward the scene 12 and a reflected beam 20 is directed back toward a receiving section 22. As is well known, the reflected beam 20 is a delayed version of the transmitted output beam 18, with the amount of phase delay being a function of the distance of the scene 12 from the range imaging system.

The reflected beam 20 strikes a photocathode 24 within an image intensifier 26, thereby producing a modulated electron stream proportional to the input amplitude variations. The image intensifier 26 is connected to the modulator 16, causing the gain of a microchannel plate 30 to modulate. The electron stream from the photocathode 24 strikes the microchannel plate 30 and is mixed with a modulating signal from the modulator 16. The modulated electron stream is amplified through secondary emission by the microchannel plate 30. The intensified electron stream bombards a phosphor screen 32, which converts the energy into a visible light image. The intensified light image signal is captured by a capture mechanism 34, such as a charge-coupled device (CCD). The captured image signal is applied to a range processor 36 to determine the phase delay at each point in the scene. In the range imaging system disclosed in the aforementioned U.S. Pat. No. 4,935,616, a reference image is captured during which time the micro-channel plate is not modulated, but rather kept at a mean response. The range is estimated for each pixel by recovering the phase term as a function of the value of the pixel in the reference image and the phase image.

Instead of collecting a phase image and a reference image, an alternative approach collects at least three phase images. This approach shifts the phase of the intensifier 26 relative to the phase of the illuminator 14, and each of the phase images has a distinct phase offset. For this purpose, the range processor 36 is suitably connected to control the phase offset of the modulator 16, as well as the average illumination level and such other capture functions as may be necessary. Mathematically, only three samples (from three images) are required to retrieve an estimate of the phase term, which is proportional to the distance of an object in the scene from the imaging system. Further details concerning the SRI camera, and the calculation of the phase term, can be found in the aforementioned copending U.S. patent application Ser. No. 09/803,802, which is incorporated herein by reference.

As mentioned in the background section, a version of such a scannerless range imaging system that is capable of yielding color intensity images in addition to the 3-D range images is described in commonly assigned, copending U.S. patent application Ser. No. 09/572,522, entitled "Method and Apparatus for a Color Scannerless Range Imaging System", which is incorporated herein by reference. The SRI camera described therein utilizes a beamsplitter located in its primary optical path to separate the image light into two channels, a first channel including an infrared component and a second channel including a color texture component. The image intensifier is operative in the first channel to receive the infrared component and the modulating signal, and to generate a processed infrared component with phase data indicative of range information. An optical network is provided to recombine the two optical paths such that the processed infrared component and the color texture component are both directed to the capture mechanism to obtain color intensity images as well as range images.

Although an SRI (scannerless range imaging) camera is used in the preferred embodiment, it should be understood that the invention may be used in connection with other types of range imaging systems, such as scanned systems, and the claims, unless specifically directed to SRI systems, are intended to read without limitation on any kind of range imaging system. Moreover, there may be applications, e.g., in creating virtual images of small objects, where the SRI camera may be stationary and the "scene" may be rotated, e.g., on a turntable, in order to obtain overlapping images.

In summary, the present invention describes a system for automatically constructing a 3-D model of a physical scene. This system utilizes a range camera to generate 3-D panoramas from a variety of spatial locations. Existing techniques for merging range images are applied to the task of merging 3-D panoramas. The advantage of this invention is that the use of the 3-D panoramas drastically simplifies the merging process compared to merging the entire set of individual range images. This invention enables a complete 3-D surface description to be easily derived for an arbitrary physical scene.

The invention has been described with reference to a preferred embodiment. However, it will be appreciated that variations and modifications can be effected by a person of ordinary skill in the art without departing from the scope of the invention.

PARTS LIST

10 SRI camera
12 scene
14 illuminator
16 modulator
18 output beam 20 reflected beam
22 receiving section
24 photocathode
26 image intensifier
30 microchannel
32 phosphor screen
34 capture mechanism
36 range processor
100 method for 3-D scene modeling
102 3D panoramic image generation step
104 3D global registration step
106 3D stitching/integration step
108 texture mapping step
200 select spatial position step
204 capture overlapping images step
206 3D spatial position panoramic image generation
208 adequate coverage query
300 objects
302 range imaging system
304 first spatial point
306 plurality of views
308 another spatial point
310 plurality of views
400 conversion to mesh representation
402 identification of overlapping meshes
404 determination of local transformations
406 determination of global positions
500 apparatus
502 3D capturing system
504 3D panoramic generation system
506 3D registration system
508 image stitching/integration system
510 texture mapping system
512 graphics display system

What is claimed is:

1. A method for deriving a three-dimensional model of a scene from a plurality of images of the scene, said method comprising the steps of:
(a) generating a plurality of three-dimensional panoramic images of a scene, wherein each three-dimensional panoramic image is derived from a plurality of range images captured from a distinct spatial position;
(b) determining transformations that align the plurality of three-dimensional panoramic images;
(c) integrating spatial information from the plurality of three-dimensional panoramic images to form a spatial three-dimensional model of the scene; and
(d) integrating intensity and texture information from the plurality of three-dimensional panoramic images onto the spatial three-dimensional model to form a three-dimensional model of the scene containing both spatial and intensity information;
wherein the step (a) of generating a plurality of three-dimensional panoramic images further comprises:
(i) positioning a camera at a first distinct spatial location;
(ii) acquiring the plurality of range images of the scene by rotating the camera about a vertical axis relative to the scene, wherein there is an inter-overlap region between adjacent images;
(iii) forming a three-dimensional panoramic image about the vertical axis from the plurality of range images acquired in step (ii); and
(iv) generating a plurality of three-dimensional panoramic images by repeating steps (i) through (iii) at additional spatial positions in the scene.

2. The method as claimed in claim 1, wherein the camera is a scannerless range imaging camera.

3. The method as claimed in claim 1, wherein the step (b) of determining the transformations that align the plurality of three-dimensional panoramic images further comprises:
determining one or more pairs of three-dimensional panoramic images that contain some common scene information;
determining the transformations that align each pair of three-dimensional panoramic images that contain some common scene information; and
determining global inconsistencies in the transformations found in step (b).

4. The method as claimed in claim 1, wherein the step (d) of integrating the intensity and texture information from the plurality of three-dimensional panoramic images assumes a Lambertian reflectance model.

5. The method as claimed in claim 1, wherein the step (d) of integrating the intensity and texture information from the plurality of three-dimensional panoramic images assumes a reflectance model that depends on the viewpoint of the observer.

6. The method as claimed in claim 1, wherein the three-dimensional panoramic image is a color image.

7. The method as claimed in claim 1, wherein one or more range images are juxtaposed between a pair of three-dimensional panoramic images before initiating the step (b) of determining the transformations that align the plurality of three-dimensional panoramic images.

8. A computer program product for deriving a three-dimensional model of a scene from a plurality of three-dimensional panoramic images of a scene, wherein each three-dimensional panoramic image is derived from a plurality of range images captured from a distinct spatial position; said computer program product comprising a computer readable storage medium having a computer program stored thereon for performing the steps of:
(a) determining transformations that align the plurality of three-dimensional panoramic images;
(b) integrating spatial information from the plurality of three-dimensional panoramic images to form a spatial three-dimensional model of the scene; and
(c) integrating intensity and texture information from the plurality of three-dimensional panoramic images onto the spatial three-dimensional model to form a three-dimensional model of the scene containing both spatial and intensity information;
wherein the step (a) of determining the transformations that align the plurality of three-dimensional panoramic images further comprises:
determining one or more pairs of three-dimensional panoramic images that contain some common scene information;
determining the transformations that align each pair of three-dimensional panoramic images that contain some common scene information; and
determining global inconsistencies in the transformations found in step (b).

9. The computer program product as claimed in claim 8 wherein the step (c) of integrating the intensity and texture information from the plurality of three-dimensional panoramic images assumes Lambertian reflectance model.

10. The computer program product as claimed in claim 8 wherein the step (c) of integrating the intensity and texture information from the plurality of three-dimensional panoramic images assumes reflectance model that depends on the viewpoint of the observer.

11. The computer program product as claimed in claim 8 wherein the three-dimensional panoramic image is a color image.

12. The computer program product as claimed in claim 8 wherein one or more range images are juxtaposed between a pair of three-dimensional panoramic images before initiating the step (a) of determining the transformations that align the plurality of three-dimensional panoramic images.

13. A method for deriving a three-dimensional model of a scene, said method comprising the steps of:

generating a plurality of three-dimensional panoramic images, wherein each of said three-dimensional panoramic images is derived from a respective set of range images, each said set having a different nodal point;

determining global registration positions of a plurality of three-dimensional panoramic images of a scene to provide registered three-dimensional panoramic images;

integrating spatial information from said registered three-dimensional panoramic images to form a spatial three-dimensional model of the scene; and integrating intensity and texture information from said three-dimensional panoramic images into said spatial three-dimensional model to form a three-dimensional model of the scene containing both spatial and intensity information.

14. The method of claim 13 wherein each said set has a plurality of range images all having the respective said nodal point.

15. The method of claim 14 further comprising capturing each said set of range images.

16. A method for deriving a three-dimensional model of a scene from a plurality of three-dimensional panoramic images of a scene; said method comprising the steps of:

determining global registration positions of said three-dimensional panoramic images to provide registered three-dimensional panoramic images wherein each of said three-dimensional panoramic images is derived from a respective set of range images, each said set having a different nodal point;

integrating spatial information from the plurality of three-dimensional panoramic images to form a spatial three-dimensional model of the scene; and integrating intensity and texture information from the plurality of three-dimensional panoramic images into the spatial three-dimensional model to form a three-dimensional model of the scene containing both spatial and intensity information, wherein said determining step further comprises:

converting each said three dimensional panoramic range image into a mesh representation;

identifying overlapping mesh representations;

computing local transformations representing respective said registrations; and checking global consistency of said local transformations.

17. The method of claim 16 wherein said determining step further comprises:

determining one or more pairs of three-dimensional panoramic images that contain some common scene information;

determining the transformations that align each pair of three-dimensional panoramic images that contain some common scene information; and determining global inconsistencies in said transformations.

\* \* \* \* \*